United States Patent
Kwon et al.

(10) Patent No.: US 9,752,660 B2
(45) Date of Patent: Sep. 5, 2017

(54) PLANETARY GEAR TRAIN OF AUTOMATIC TRANSMISSION FOR A VEHICLE

(71) Applicant: Hyundai Motor Company, Seoul (KR)

(72) Inventors: Hyun Sik Kwon, Seoul (KR); Jae Chang Kook, Hwaseong-si (KR); Seongwook Ji, Ansan-si (KR); Wonmin Cho, Hwaseong-si (KR); Wookjin Jang, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 90 days.

(21) Appl. No.: 14/947,281

(22) Filed: Nov. 20, 2015

(65) Prior Publication Data

US 2017/0074364 A1   Mar. 16, 2017

(30) Foreign Application Priority Data

Sep. 14, 2015   (KR) .................. 10-2015-0129869

(51) Int. Cl.
*F16H 3/62*    (2006.01)
*F16H 3/44*    (2006.01)
(Continued)

(52) U.S. Cl.
CPC ......... *F16H 3/66* (2013.01); *F16H 2200/006* (2013.01); *F16H 2200/201* (2013.01);
(Continued)

(58) Field of Classification Search
CPC ................... F16H 2200/201; F16H 2200/2046
See application file for complete search history.

(56) References Cited

U.S. PATENT DOCUMENTS 6,648,793 B1 * 11/2003 Kao .................. F16H 3/66
                                                       475/296
6,746,361 B2 * 6/2004 Lee .................. F16H 3/66
                                                       475/296
(Continued)

FOREIGN PATENT DOCUMENTS

JP    2005-106260 A    4/2005
JP    2009-162339 A    7/2009
KR    10-2012-0121158 A    5/2012

*Primary Examiner* — Tisha Lewis
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft, a first planetary gear set, a second planetary gear set, a third planetary gear set, six friction elements disposed to selectively connect rotation elements of the planetary gear sets with each other and selectively connect the rotation elements with a transmission housing, a first rotation shaft selectively connected to the input shaft, a second rotation shaft, a third rotation shaft selectively connected to at least one of the input shaft and the transmission housing, a fourth rotation shaft selectively connected to the second rotation shaft, a fifth rotation shaft selectively connected to the second rotation shaft, a sixth rotation shaft directly connected to the transmission housing, and a seventh rotation shaft selectively connected to the second rotation shaft, and directly connected to the output shaft.

10 Claims, 2 Drawing Sheets

(51) Int. Cl.
*F16H 37/06* (2006.01)
*F16H 3/66* (2006.01)

(52) U.S. Cl.
CPC ............... *F16H 2200/2046* (2013.01); *F16H 2200/2097* (2013.01)

(56) References Cited

U.S. PATENT DOCUMENTS

| | | |
|---|---|---|
| 8,096,914 B2 | 1/2012 | Aota et al. |
| 9,625,009 B2* | 4/2017 | Kwon ..................... F16H 3/66 |
| 2003/0162629 A1* | 8/2003 | Bucknor ................. F16H 3/66 |
| | | 475/330 |

* cited by examiner

FIG. 2

| Speed Stage | Friction element | | | | | | Gear Ratio |
|---|---|---|---|---|---|---|---|
| | C1 | C2 | C3 | C4 | C5 | B1 | |
| D1 | ● | | | | ● | ● | 4.235 |
| D2 | ● | | | ● | | ● | 2.092 |
| D3 | ● | | | ● | ● | | 1.714 |
| D4 | ● | | ● | ● | | | 1.498 |
| D5 | ● | ● | | ● | | | 1.409 |
| D6 | | ● | ● | ● | | | 1.226 |
| D7 | | ● | ● | | ● | | 1.000 |
| D8 | | ● | | ● | ● | | 0.779 |
| REV | ● | | ● | | | ● | -1.200 |

PLANETARY GEAR TRAIN OF AUTOMATIC TRANSMISSION FOR A VEHICLE

CROSS-REFERENCE TO RELATED APPLICATION

The present application claims priority to Korean Patent Application No. 10-2015-0129869, filed Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that improves power delivery performance and reduces fuel consumption by achieving eight forward speed stages using a minimum number of constituent elements.

Description of Related Art

In recent years, a rise in oil price caused unlimited competition for enhancing fuel efficiency.

As a result, research is being conducted on engines in terms of reducing weight and improving fuel efficiency by down-sizing, and research is also being conducted for simultaneously securing operability and fuel efficiency competitiveness by implementing an automatic transmission with multiple speed stages.

However, in the automatic transmission, as the number of speed stages increase, the number of internal components increase, and as a result, the automatic transmission may be difficult to mount, the manufacturing cost and weight may be increased, and power transmission efficiency may be deteriorated.

Accordingly, development of a planetary gear train which may bring about maximum efficiency with a small number of components is important in order to increase a fuel efficiency enhancement effect through the multiple speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving eight forward speed stages and one reverse speed stage using a minimum number of constituent elements and of improving silent driving using a driving point positioned at a low engine speed.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, six friction elements disposed to selectively connect the rotation elements with each other and selectively connect the rotation elements with a transmission housing, a first rotation shaft including the first and ninth rotation elements and selectively connected to the input shaft, a second rotation shaft including the second rotation element, a third rotation shaft including the third rotation element and selectively connected to at least one of the input shaft and the transmission housing, a fourth rotation shaft including the fourth rotation element and selectively connected to the second rotation shaft, a fifth rotation shaft including the fifth and seventh rotation elements and selectively connected to the second rotation shaft, a sixth rotation shaft including the sixth rotation element and directly connected to the transmission housing, and a seventh rotation shaft including the eighth rotation element and selectively connected to the second rotation shaft, and directly connected to the output shaft.

The first planetary gear set may be a single-pinion planetary gear set, in which the first rotation element is a first sun gear, the second rotation element is a first planet carrier, and the third rotation element is a first ring gear, the second planetary gear set may be a single-pinion planetary gear set, in which the fourth rotation element is a second sun gear, the fifth rotation element is a second planet carrier, and the sixth rotation element is a second ring gear, and the third planetary gear set may be a single-pinion planetary gear set, in which the seventh rotation element is a third sun gear, the eighth rotation element is a third planet carrier, and the ninth rotation element is a third ring gear.

The six friction elements may include a first clutch selectively connecting the input shaft and the first rotation shaft, a second clutch selectively connecting the input shaft and third rotation shaft, a third clutch selectively connecting the second rotation shaft and the seventh rotation shaft, a fourth clutch selectively connecting the second rotation shaft and the fourth rotation shaft, a fifth clutch selectively connecting the second rotation shaft and the fifth rotation shaft, and a first brake selectively connecting the third rotation shaft and the transmission housing.

Shift speed stages achieved by selectively operating the six friction elements may include a first forward speed stage achieved by simultaneous operation of the first and fifth clutches and the first brake, a second forward speed stage achieved by simultaneous operation of the first, and fourth clutches and the first brake, a third forward speed stage achieved by simultaneous operation of the first, fourth, and fifth clutches, a fourth forward speed stage achieved by simultaneous operation of the first, third, and fourth clutches, a fifth forward speed stage achieved by simultaneous operation of the first, second, and fourth clutches, a sixth forward speed stage achieved by simultaneous operation of the second, third, and fourth clutches, a seventh forward speed stage achieved by simultaneous operation of the second, third, and fifth clutches, an eighth forward speed stage achieved by simultaneous operation of the second, fourth, and fifth clutches, and a reverse speed stage achieved by simultaneous operation of the first and third clutches and the first brake.

According to various aspects of the present invention, a planetary gear train of an automatic transmission for a vehicle may include an input shaft receiving torque of an engine, an output shaft outputting changed torque, a first planetary gear set being a single-pinion planetary gear set, and including first, second, and third rotation elements, a second planetary gear set being a single-pinion planetary gear set, and including fourth, fifth and sixth rotation elements, and a third planetary gear set being a single-pinion planetary gear set, and including seventh, eighth and ninth rotation elements, a first rotation shaft including the first and ninth rotation elements and selectively connected to the input shaft, a second rotation shaft including the second rotation element, a third rotation shaft including the third rotation element and selectively connected to the input shaft or the transmission housing, a fourth rotation shaft including the fourth rotation element and selectively connected to the second rotation shaft, a fifth rotation shaft including the fifth and seventh rotation elements and selectively connected to the second rotation shaft, a sixth rotation shaft including the sixth rotation element and directly connected to the transmission housing, a seventh rotation shaft including the eighth rotation element and selectively connected to the second rotation shaft, and directly connected to the output shaft, a first clutch selectively connecting the input shaft and the first rotation shaft, a second clutch selectively connecting the input shaft and third rotation shaft, a third clutch selectively connecting the second rotation shaft and the seventh rotation shaft, a fourth clutch selectively connecting the second rotation shaft and the fourth rotation shaft, a fifth clutch selectively connecting the second rotation shaft and the fifth rotation shaft, and a first brake selectively connecting the third rotation shaft and the transmission housing.

According to various aspects of the present invention, a planetary gear train of an automatic transmission for a vehicle may include an input shaft receiving torque of an engine, an output shaft outputting changed torque, a first planetary gear set being a single-pinion planetary gear set, and including first, second, and third rotation elements, a second planetary gear set being a single-pinion planetary gear set, and including fourth, fifth and sixth rotation elements, and a third planetary gear set being a single-pinion planetary gear set, and including seventh, eighth and ninth rotation elements, a first rotation shaft including the first sun gear and the third ring gear and selectively connected to the input shaft, a second rotation shaft including the first planet carrier, a third rotation shaft including the first ring gear and selectively connected to the input shaft or the transmission housing, a fourth rotation shaft including the second sun gear and selectively connected to the second rotation shaft, a fifth rotation shaft including the second planet carrier and the third sun gear and selectively connected to the second rotation shaft, a sixth rotation shaft including the second ring gear and directly connected to the transmission housing, a seventh rotation shaft including the third planet carrier and selectively connected to the second rotation shaft and directly connected to the output shaft, and six friction elements disposed to selectively connect the rotation elements with each other and selectively connect the rotation elements with a transmission housing.

Various embodiments of the present invention achieve eight forward speed stages and one reverse speed stage by combining three planetary gear sets which are formed as simple planetary gear sets, with six friction elements.

Also, silent drivability of vehicle may be improved greatly through the multiple speed stages of the automatic transmission appropriate to the engine rotation speed.

Further, engine driving efficiency may be maximized, and power delivery performance and fuel economy may be improved through the multiple speed stages of the automatic transmission appropriate to the engine rotation speed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the exemplary planetary gear train according to the present invention.

Figure 1:
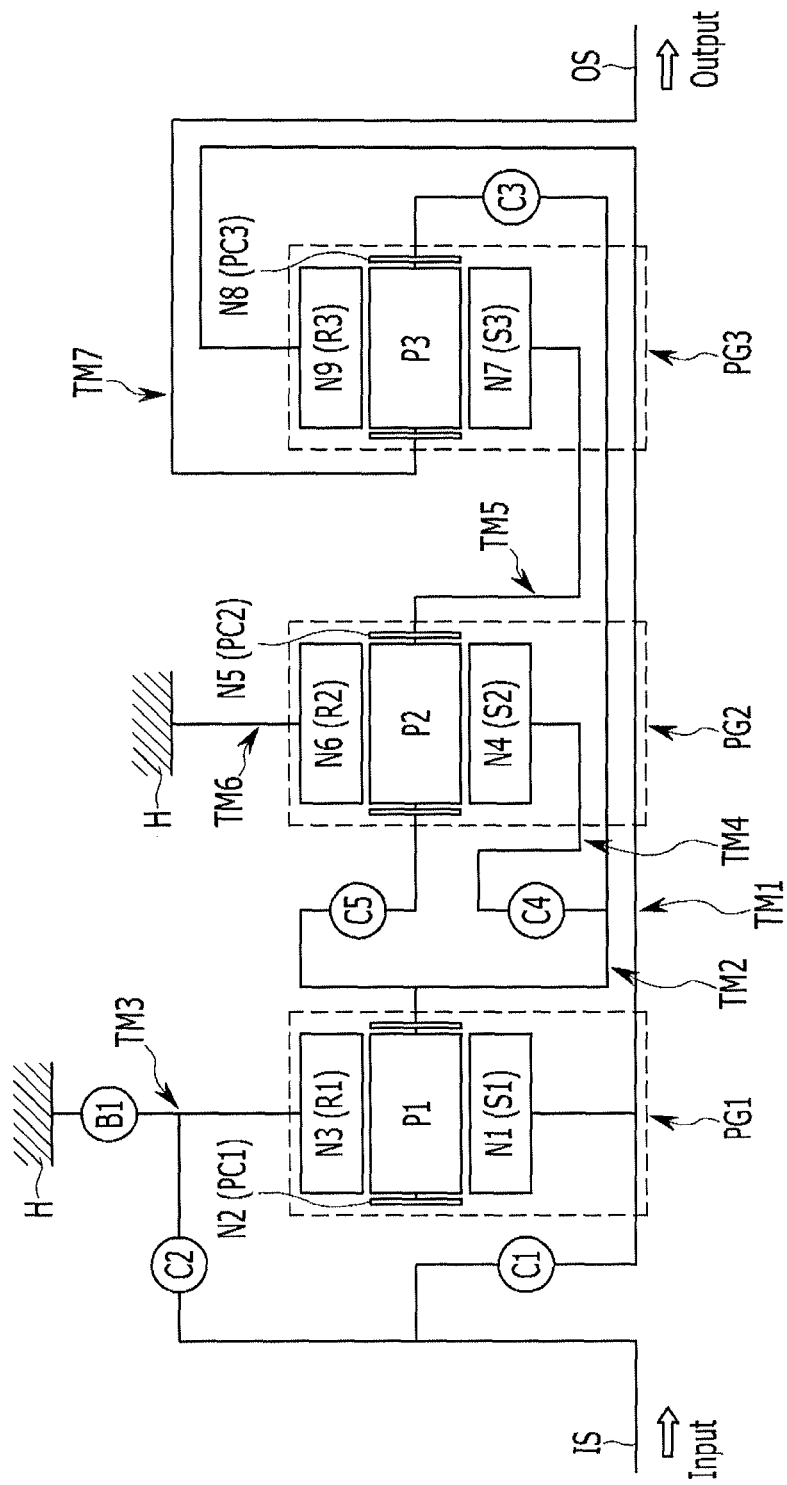
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes first, second, and third planetary gear sets PG1, PG2, and PG3 disposed on the same axis, and an input shaft IS, an output shaft OS, seven rotation shafts TM1 to TM7 composing respective rotation elements of the first, second, third, fourth, and fifth planetary gear sets PG1, PG2, and PG3, six friction elements C1 to C5 and B1, and a transmission housing H.

As a result, torque input from the input shaft IS is transmitted by an inter-complementation operation of the first, second, and third planetary gear sets PG1, PG2, and PG3, to be output through the output shaft OS.

The respective simple planetary gear sets are disposed in a sequence of the first, second, and third planetary gear sets PG1, PG2, and PG3 from an engine side.

The input shaft IS is an input member and rotational power from a crankshaft of an engine is torque-converted through a torque converter to be input into the input shaft IS.

The output shaft OS is an output member, is disposed on the same axis as the input shaft IS, and transfers transmitted driving torque to a driving shaft through a differential apparatus.

The first planetary gear set PG1 as a single-pinion planetary gear set includes a first sun gear S1 which is a first rotation element N1, a first planetary carrier PC1 which is a second rotation element N2 that supports a first pinion P1 which outer-engages with the first sun gear S1 which is the first rotation element N1, and a first ring gear R1 which is a third rotation element N3 which inner-engages with the first pinion P1 as rotation elements.

The second planetary gear set PG2 as a single-pinion planetary gear set includes a second sun gear S2 which is a fourth rotation element N4, a second planet carrier PC2 which is a fifth rotation element N5 that supports a second pinion P2 which outer-engages with the second sun gear S2 which is the fourth rotation element N4, and a second ring gear R2 which is a sixth rotation element N6 which inner-engages with the second pinion P2 as rotation elements.

The third planetary gear set PG3 as a single-pinion planetary gear set includes a third sun gear S3 which is a seventh rotation element N7, a third planet carrier PC3 which is an eighth rotation element N8 that supports a third pinion P3 which outer-engages with the third sun gear S3 which is the seventh rotation element N7, and a third ring gear R3 which is a ninth rotation element N9 which inner-engages with the third pinion P3 as the rotation elements.

In the first, second, and third planetary gear sets PG1, PG2, and PG3, the first rotation element N1 is directly connected to the ninth rotation element N9, the fifth rotation element N5 is directly connected to the seventh rotation element N7 so as to be operated with a total of seven rotation shafts TM1 to TM7.

Configurations of the eight rotation shafts TM1 to TM7 will be described below.

The first rotation shaft TM1 includes the first rotation element N1 (the first sun gear S1), the sixth rotation element N6 (the second ring gear R2), and the tenth rotation element N10 (the fourth sun gear S4) and is selectively connected to the input shaft IS.

The second rotation shaft TM2 includes the second rotation element N2 (the first planet carrier PC1).

The third rotation shaft TM3 includes the third rotation element N3 (the first ring gear R1) and is selectively connected to the input shaft IS and the transmission housing H.

The fourth rotation shaft TM4 includes the fourth rotation element N4 (the second sun gear S2) and is selectively connected to the second rotation shaft TM2.

The fifth rotation shaft TM5 includes the fifth rotation element N5 (the second planet carrier PC2) and the seventh rotation element N7 (the third sun gear S3), and is selectively connected to the second rotation shaft TM2.

The sixth rotation shaft TM6 includes the sixth rotation element N6 (the second ring gear R2) and is directly connected to the transmission housing H.

The seventh rotation shaft TM7 includes the eighth rotation element N8 (third planet carrier PC3), and is directly connected to the output shaft OS and is selectively connected to the second rotation shaft TM2.

In addition, among the rotation shafts TM1 to TM7, five clutches C1, C2, C3, C4, and C5 which are friction elements are disposed at connection portions where the rotation shafts are connected to each other.

In addition, among the rotation shafts TM1 to TM7, a brake B1 which is friction element is disposed at connection portions between any one rotation shaft and the transmission housing H.

The six friction elements C1 to C5 and B1 will be described in further detail.

The first clutch C1 is disposed between the input shaft IS and the first rotation shaft TM1 and selectively connects the input shaft IS and the first rotation shaft TM1.

The second clutch C2 is disposed between the input shaft IS and the third rotation shaft TM3 and selectively connects the input shaft IS and the third rotation shaft TM3.

The third clutch C3 is disposed between the second rotation shaft TM2 and the seventh rotation shaft TM7 and selectively connected the second rotation shaft TM2 and the seventh rotation shaft TM7.

The fourth clutch C4 is disposed between the second rotation shaft TM2 and the fourth rotation shaft TM4 and selectively connects the second rotation shaft TM2 and the fourth rotation shaft TM4.

The fifth clutch C5 is disposed between the second rotation shaft TM2 and the fifth rotation shaft TM5 and selectively connects the second rotation shaft TM2 and the fifth rotation shaft TM5.

The first brake B1 is disposed between the third rotation shaft TM3 and the transmission housing H and selective causes the third rotation shaft TM3 to be operated as a fixed element.

The friction elements including the first, second, third, fourth, and fifth clutches C1, C2, C3, C4 and C5 and the first brake B1 may be multi-plate friction elements of a wet type that are operated by hydraulic pressure.

FIG. 2 is an operation chart of friction elements at each speed stage in the planetary gear train according to various embodiments of the present invention.

As shown in FIG. 2, three friction elements are operated at each speed stage in the planetary gear train according to various embodiments of the present invention. Shifting processes in the various embodiments of the present invention will be described in further detail.

The first and fifth clutches C1 and C5 and the first brake B1 are simultaneously operated at the first forward speed stage D1. In a state that the input shaft IS is connected to the first rotation shaft TM1 by operation of the first clutch C1, the second rotation shaft TM2 is connected to the fifth rotation shaft TM5 by operation of the fifth clutch C5, the input is made into the first rotation shaft TM1, the sixth rotation shaft TM6 is always operated as a fixed element, and the third rotation shaft TM3 is operated as the fixed element by operation of the first brake B1. Therefore, the first forward speed stage D1 is achieved.

The first and fourth clutches C1 and C4 and the first brake B1 are simultaneously operated at the second forward speed stage D2. In a state that the input shaft IS is connected to the first rotation shaft TM1 by operation of the first clutch C1, the second rotation shaft TM2 is connected to the fourth rotation shaft TM4 by operation of the fourth clutch C4, the input is made into the first rotation shaft TM1, the sixth rotation shaft TM6 is always operated as the fixed element, and the third rotation shaft TM3 is operated as the fixed element by operation of the first brake B1. Therefore, the second forward speed stage D2 is achieved.

The first, fourth, and fifth clutches C1, C4, and C5 are simultaneously operated at the third forward speed stage D3. In a state that the input shaft IS is connected to the first rotation shaft TM1 by operation of the first clutch C1, the second rotation shaft TM2 is connected to the fourth rotation shaft TM4 by operation of the fourth clutch C4, the second rotation shaft TM2 is connected to the fifth rotation shaft TM5 by operation of the fifth clutch C5, the input is made into the first rotation shaft TM1, and the sixth rotation shaft TM6 is always operated as the fixed element. Therefore, the third forward speed stage D3 is achieved.

The first, third, and fourth clutches C1, C3, and C4 are simultaneously operated as the fourth forward speed stage D4. In a state that the input shaft IS is connected to the first rotation shaft TM1 by operation of the first clutch C1, the second rotation shaft TM2 is connected to the seventh rotation shaft TM7 by operation of the third clutch C3, the second rotation shaft TM2 is connected to the fourth rotation shaft TM4 by operation of the fourth clutch C4, the input is made into the first rotation shaft TM1, and the sixth rotation shaft TM6 is always operated as the fixed element. Therefore, the fourth forward speed stage is achieved.

The first, second, and fourth clutches C1, C2, and C4 are simultaneously operated as the fifth forward speed stage D5. In a state that the input shaft IS is connected to the first rotation shaft TM1 by operation of the first clutch C1, the input shaft IS is connected to the third rotation shaft TM3 by operation of the second clutch C2, the second rotation shaft TM2 is connected to the fourth rotation shaft TM4 by operation of the fourth clutch C4, the input is made into the first and third rotation shaft TM1 and TM3, and the sixth rotation shaft TM6 is always operated as the fixed element. Therefore, the fifth forward speed stage D5 is achieved.

The second, third, and fourth clutches C2, C3, and C4 are simultaneously operated at the sixth forward speed stage D6. In a state that the input shaft IS is connected to the third rotation shaft TM3 by operation of the second clutch C2, the second rotation shaft TM2 is connected to the seventh rotation shaft TM7 by operation of the third clutch C3, the second rotation shaft TM2 is connected to the fourth rotation shaft TM4 by operation of the fourth clutch C4, the input is made into the third rotation shaft TM3, and the sixth rotation shaft TM6 is always operated as the fixed element. Therefore, the sixth forward speed stage D6 is achieved.

The second, third, and fifth clutches C2, C3, and C5 are simultaneously operated as the seventh forward speed stage D7. In a state that the input shaft IS is connected to the third rotation shaft TM3 by operation of the second clutch C2, the second rotation shaft TM2 is connected to the seventh rotation shaft TM7 by operation of the third clutch C3, the second rotation shaft TM2 is connected to the fifth rotation shaft TM5 by operation of the fifth clutch C5, the input is made into the third rotation shaft TM3, and the sixth rotation shaft TM6 is always operated as the fixed element. Therefore, the seventh forward speed stage D7 is achieved.

The second, fourth, and fifth clutches C2, C4, and C5 are simultaneously operated as the eighth forward speed stage D8. In a state that the input shaft IS is connected to the third rotation shaft TM3 by operation of the second clutch C2, the second rotation shaft TM2 is connected to the fourth rotation shaft TM4 by operation of the fourth clutch C4, the second rotation shaft TM2 is connected to the fifth rotation shaft TM5 by operation of the fifth clutch C5, the input is made into the third rotation shaft TM3, and the sixth rotation shaft TM6 is always operated as the fixed element. Therefore, the eighth forward speed stage D8 is achieved.

The first and third clutches C1 and C3 and the first brake B1 are simultaneously operated as the reverse speed stage REV. In a state that the input shaft IS is connected to the first rotation shaft TM1 by operation of the first clutch C1, the second rotation shaft TM2 is connected to the seventh rotation shaft TM7 by operation of the third clutch C3, the input is made into the first rotation shaft TM1, the sixth rotation shaft TM6 is always operated as the fixed element, and the third rotation shaft TM3 is operated as the fixed element by operation of the first brake B1. Therefore, the reverse speed stage REV is achieved.

The planetary gear train according to various embodiments of the present invention may achieve eight forward speed stages and one reverse speed stage by control of four planetary gear sets PG1, PG2, and PG3, five clutches C1, C2, C3, C4, and C5, and one brake B1.

Also, silent drivability of vehicle may be improved greatly through the multiple speed stages of the automatic transmission appropriate to the engine rotation speed.

Further, engine driving efficiency may be maximized, and power delivery performance and fuel economy may be improved through the multiple speed stages of the automatic transmission appropriate to the engine rotation speed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque of the engine;
   a first planetary gear set including first, second, and third rotation elements;
   a second planetary gear set including fourth, fifth, and sixth rotation elements;
   a third planetary gear set including seventh, eighth, and ninth rotation elements;
   six friction elements disposed to selectively connect the rotation elements with each other and selectively connect the rotation elements with a transmission housing;
   a first rotation shaft including the first and ninth rotation elements and selectively connected to the input shaft;
   a second rotation shaft including the second rotation element;
   a third rotation shaft including the third rotation element and selectively connected to at least one of the input shaft and the transmission housing;
   a fourth rotation shaft including the fourth rotation element and selectively connected to the second rotation shaft;
   a fifth rotation shaft including the fifth and seventh rotation elements and selectively connected to the second rotation shaft;
   a sixth rotation shaft including the sixth rotation element and directly connected to the transmission housing; and
   a seventh rotation shaft including the eighth rotation element and selectively connected to the second rotation shaft, and directly connected to the output shaft.

2. The planetary gear train of claim 1, wherein:
   the first planetary gear set is a single-pinion planetary gear set, in which the first rotation element is a first sun gear, the second rotation element is a first planet carrier, and the third rotation element is a first ring gear,
   the second planetary gear set is a single-pinion planetary gear set, in which the fourth rotation element is a second sun gear, the fifth rotation element is a second planet carrier, and the sixth rotation element is a second ring gear, and the third planetary gear set is a single-pinion planetary gear set, in which the seventh rotation element is a third sun gear, the eighth rotation element is a third planet carrier, and the ninth rotation element is a third ring gear.

3. The planetary gear train of claim 1, wherein the six friction elements comprise:
a first clutch selectively connecting the input shaft and the first rotation shaft;
a second clutch selectively connecting the input shaft and third rotation shaft;
a third clutch selectively connecting the second rotation shaft and the seventh rotation shaft;
a fourth clutch selectively connecting the second rotation shaft and the fourth rotation shaft;
a fifth clutch selectively connecting the second rotation shaft and the fifth rotation shaft; and
a first brake selectively connecting the third rotation shaft and the transmission housing.

4. The planetary gear train of claim 3, wherein shift speed stages achieved by selectively operating the six friction elements comprise:
a first forward speed stage achieved by simultaneous operation of the first and fifth clutches and the first brake;
a second forward speed stage achieved by simultaneous operation of the first and fourth clutches and the first brake;
a third forward speed stage achieved by simultaneous operation of the first, fourth, and fifth clutches;
a fourth forward speed stage achieved by simultaneous operation of the first, third, and fourth clutches;
a fifth forward speed stage achieved by simultaneous operation of the first, second, and fourth clutches;
a sixth forward speed stage achieved by simultaneous operation of the second, third, and fourth clutches;
a seventh forward speed stage achieved by simultaneous operation of the second, third, and fifth clutches;
an eighth forward speed stage achieved by simultaneous operation of the second, fourth, and fifth clutches; and
a reverse speed stage achieved by simultaneous operation of the first and third clutches, and the first brake.

5. A planetary gear train of an automatic transmission for a vehicle, comprising:
an input shaft receiving torque of an engine;
an output shaft outputting changed torque;
a first planetary gear set being a single-pinion planetary gear set, and including first, second, and third rotation elements;
a second planetary gear set being a single-pinion planetary gear set, and including fourth, fifth and sixth rotation elements; and
a third planetary gear set being a single-pinion planetary gear set, and including seventh, eighth and ninth rotation elements;
a first rotation shaft including the first and ninth rotation elements and selectively connected to the input shaft;
a second rotation shaft including the second rotation element;
a third rotation shaft including the third rotation element and selectively connected to the input shaft or the transmission housing;
a fourth rotation shaft including the fourth rotation element and selectively connected to the second rotation shaft;
a fifth rotation shaft including the fifth and seventh rotation elements and selectively connected to the second rotation shaft;
a sixth rotation shaft including the sixth rotation element and directly connected to the transmission housing;
a seventh rotation shaft including the eighth rotation element and selectively connected to the second rotation shaft, and directly connected to the output shaft;
a first clutch selectively connecting the input shaft and the first rotation shaft;
a second clutch selectively connecting the input shaft and third rotation shaft;
a third clutch selectively connecting the second rotation shaft and the seventh rotation shaft;
a fourth clutch selectively connecting the second rotation shaft and the fourth rotation shaft;
a fifth clutch selectively connecting the second rotation shaft and the fifth rotation shaft; and
a first brake selectively connecting the third rotation shaft and the transmission housing.

6. The planetary gear train of claim 5, wherein:
the first planetary gear set is a single-pinion planetary gear set, in which the first rotation element is a first sun gear, the second rotation element is a first planet carrier, and the third rotation element is a first ring gear,
the second planetary gear set is a single-pinion planetary gear set, in which the fourth rotation element is a second sun gear, the fifth rotation element is a second planet carrier, and the sixth rotation element is a second ring gear, and
the third planetary gear set is a single-pinion planetary gear set, in which the seventh rotation element is a third sun gear, the eighth rotation element is a third planet carrier, and the ninth rotation element is a third ring gear.

7. The planetary gear train of claim 5, wherein shift speed stages achieved by selectively operating the five clutches and the one brake comprise:
a first forward speed stage achieved by simultaneous operation of the first and fifth clutches and the first brake;
a second forward speed stage achieved by simultaneous operation of the first and fourth clutches and the first brake;
a third forward speed stage achieved by simultaneous operation of the first, fourth, and fifth clutches;
a fourth forward speed stage achieved by simultaneous operation of the first, third, and fourth clutches;
a fifth forward speed stage achieved by simultaneous operation of the first, second, and fourth clutches;
a sixth forward speed stage achieved by simultaneous operation of the second, third, and fourth clutches;
a seventh forward speed stage achieved by simultaneous operation of the second, third, and fifth clutches;
an eighth forward speed stage achieved by simultaneous operation of the second, fourth, and fifth clutches; and
a reverse speed stage achieved by simultaneous operation of the first and third clutches, and the first brake.

8. A planetary gear train of an automatic transmission for a vehicle, comprising:
an input shaft receiving torque of an engine;
an output shaft outputting changed torque;

a first planetary gear set being a single-pinion planetary gear set, and including first sun gear, a first ring gear, and a first planet carrier as rotation elements;

a second planetary gear set being a single-pinion planetary gear set, and including a second sun gear, a second ring gear and a second planet carrier as rotation elements; and a third planetary gear set being a single-pinion planetary gear set, and including a third sun gear, a third ring gear and a third planet carrier as rotation elements;

a first rotation shaft including the first sun gear and the third ring gear and selectively connected to the input shaft;

a second rotation shaft including the first planet carrier;

a third rotation shaft including the first ring gear and selectively connected to the input shaft or a transmission housing;

a fourth rotation shaft including the second sun gear and selectively connected to the second rotation shaft;

a fifth rotation shaft including the second planet carrier and the third sun gear and selectively connected to the second rotation shaft;

a sixth rotation shaft including the second ring gear and directly connected to the transmission housing;

a seventh rotation shaft including the third planet carrier and selectively connected to the second rotation shaft and directly connected to the output shaft; and six friction elements disposed to selectively connect the rotation elements with each other and selectively connect the rotation elements with a transmission housing.

9. The planetary gear train of claim 8, wherein the six friction elements comprise:

a first clutch selectively connecting the input shaft and the first rotation shaft;

a second clutch selectively connecting the input shaft and third rotation shaft;

a third clutch selectively connecting the second rotation shaft and the seventh rotation shaft;

a fourth clutch selectively connecting the second rotation shaft and the fourth rotation shaft;

a fifth clutch selectively connecting the second rotation shaft and the fifth rotation shaft; and a first brake selectively connecting the third rotation shaft and the transmission housing.

10. The planetary gear train of claim 9, wherein shift speed stages achieved by selectively operating the six friction elements comprise:

a first forward speed stage achieved by simultaneous operation of the first and fifth clutches and the first brake;

a second forward speed stage achieved by simultaneous operation of the first and fourth clutches and the first brake;

a third forward speed stage achieved by simultaneous operation of the first, fourth, and fifth clutches;

a fourth forward speed stage achieved by simultaneous operation of the first, third, and fourth clutches;

a fifth forward speed stage achieved by simultaneous operation of the first, second, and fourth clutches;

a sixth forward speed stage achieved by simultaneous operation of the second, third, and fourth clutches;

a seventh forward speed stage achieved by simultaneous operation of the second, third, and fifth clutches;

an eighth forward speed stage achieved by simultaneous operation of the second, fourth, and fifth clutches; and a reverse speed stage achieved by simultaneous operation of the first and third clutches and the first brake.

* * * * *